(12) United States Patent
Kogure (10) Patent No.: US 10,767,829 B2
(45) Date of Patent: Sep. 8, 2020

(54) LIGHT IRRADIATION DEVICE AND VEHICULAR LAMP

(71) Applicant: Stanley Electric Co., Ltd., Tokyo (JP)

(72) Inventor: Shinya Kogure, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/189,455

(22) Filed: Nov. 13, 2018

(65) Prior Publication Data

US 2019/0145599 A1 May 16, 2019

(30) Foreign Application Priority Data

Nov. 16, 2017 (JP) .................................. 2017-220815

(51) Int. Cl.
*F21S 41/675* (2018.01)
*F21S 41/20* (2018.01)
(Continued)

(52) U.S. Cl.
CPC .......... *F21S 41/675* (2018.01); *B60Q 1/1407* (2013.01); *F21S 41/141* (2018.01);
(Continued)

(58) Field of Classification Search
CPC .......... F21S 41/141; F21S 41/50; F21S 41/40; F21S 41/285; F21S 41/365; F21S 41/675;
(Continued)

(56) References Cited

U.S. PATENT DOCUMENTS

| | | | |
|---|---|---|---|
| 2008/0084165 A1* | 4/2008 | Otsuka | B60Q 1/0023 315/82 |
| 2013/0058114 A1* | 3/2013 | Reiners | F21S 41/16 362/510 |

(Continued)

FOREIGN PATENT DOCUMENTS

| | | |
|---|---|---|
| DE | 10 2015 224 880 A1 | 6/2017 |
| EP | 2 708 948 A1 | 3/2014 |

(Continued)

OTHER PUBLICATIONS

The extended European Search Report for the related European Patent Application No. 18206309.9 dated Apr. 24, 2019.

*Primary Examiner* — Erin Kryukova
(74) *Attorney, Agent, or Firm* — Kenealy Vaidya LLP (57) ABSTRACT

A light irradiation device (1) includes a light-source module (2), a light deflector (3), a parallel light generation unit (4), and a projecting light generation unit (5) in this order along the optical path. All of the light-collection point of the light-source module (2) on the emission side, the center mirror Or of the light deflector (3), and the focal point of the parallel light generation unit (4) on the incidence side are set at the same position P1. The mirror (31) of the light deflector (3) forward- and reverse-rotates about the axis passing through the mirror center Or to emit scanning light Ls as the reflected light and the deflected light to the parallel light generation unit (4). The parallel light generation unit (4) collimates the scanning light Ls to be parallel light that is parallel to the optical axis for emission.

13 Claims, 5 Drawing Sheets

(51) Int. Cl.
  B60Q 1/14 (2006.01)
  F21S 41/141 (2018.01)
  G02B 26/10 (2006.01)
  G02B 26/08 (2006.01)
  F21S 41/40 (2018.01)
  F21S 41/50 (2018.01)
  F21S 41/64 (2018.01)
  G02B 27/30 (2006.01)
  F21S 41/365 (2018.01)

(52) U.S. Cl.
  CPC .............. *F21S 41/285* (2018.01); *F21S 41/40* (2018.01); *F21S 41/50* (2018.01); *F21S 41/645* (2018.01); *G02B 26/0858* (2013.01); *G02B 26/105* (2013.01); *F21S 41/365* (2018.01); *G02B 27/30* (2013.01)

(58) Field of Classification Search
  CPC . F21S 41/645; G02B 26/105; G02B 26/0858; G02B 27/30; B60Q 1/1407; B60Q 2300/056
  See application file for complete search history.

(56) References Cited

U.S. PATENT DOCUMENTS

| | | | |
|---|---|---|---|
| 2015/0176811 A1* | 6/2015 | Schwaiger | F21K 9/64 362/84 |
| 2016/0131321 A1* | 5/2016 | Yamanaka | F21S 41/663 362/513 |
| 2016/0347237 A1* | 12/2016 | Bhakta | F21S 41/255 |
| 2017/0113599 A1* | 4/2017 | Park | F21S 41/36 |
| 2017/0175968 A1 | 6/2017 | Shimizu et al. | |
| 2017/0305330 A1 | 10/2017 | Park | |
| 2018/0045393 A1* | 2/2018 | Yagi | F21S 41/675 |
| 2018/0142856 A1* | 5/2018 | Reinprecht | G02B 26/0833 |

FOREIGN PATENT DOCUMENTS

| | | |
|---|---|---|
| FR | 2 794 218 A1 | 12/2000 |
| FR | 3 008 477 A1 | 1/2015 |
| JP | 2016-115412 A | 6/2016 |

\* cited by examiner

LIGHT IRRADIATION DEVICE AND VEHICULAR LAMP

BACKGROUND OF THE INVENTION

Field of the Invention

The present invention relates to light irradiation devices and vehicular lamps.

Description of the Related Art

Recently various systems for vehicular lamps have been demanded to improve the night-time visibility, such as an Adaptive Driving Beam (ADB) system configured to mask the vehicle ahead and illuminate the surroundings of the vehicle ahead and an AFS (Adaptive Front Lighting System) to illuminate the turning direction of the vehicle intensely.

JP 2016-115412 A discloses a vehicular lamp for selective light irradiation of an area ahead of the vehicle. This vehicular lamp includes a light source, a collimating optics, a polarization beam splitter, a liquid crystal device and a projecting optics in this order from the upstream to the downstream along the optical path. This structure controls the liquid crystal device for selective transmission of the parallel light to be incident on the projecting optics, and so enables light irradiation while selectively masking a part of the area ahead of the vehicle.

The liquid crystal device shows different characteristics, such as contrast ratio, in accordance with the angles of incident light. It is therefore important to implement a light irradiation device allowing parallel light to be incident on the liquid crystal device.

The light irradiation device described in JP 2016-115412 A can collimate light from the light source that is diffuse at a predetermined angle of divergence and emit the parallel light. In addition, this light irradiation device can vary the brightness of the light source by current control so as to change the overall intensity of the parallel light. This light irradiation device, however, cannot adjust the illuminance distribution of the parallel light, and so cannot implement an AFS that illuminates a desired position intensely.

SUMMARY OF THE INVENTION

The present invention aims to provide a light irradiation device that can generate parallel light so that the illuminance distribution of the parallel light can be adjusted and a vehicular lamp including such a light irradiation device.

A light irradiation device of the present invention includes:

a light source;

a first optical element having a light-collection point on an emission side at a first position, and configured to collect incident light from the light source at the first position;

a light deflector including a mirror disposed at the first position and forward- and reverse-rotating around an axis passing through the first position, the light deflector being configured to reflect incident light from the first optical element with the mirror to deflect the light and emit the deflected light as scanning light; and a second optical element having a focal point on an incidence side at the first position and having an optical axis, the second optical element being configured to emit the scanning light from the mirror as scanning light that is parallel to the optical axis.

According to the present invention, the light-collection point of the first optical element on the emission side, the position of the mirror of the light deflector, and the focal point of the second optical element on the incidence side are set at the first position. With this configuration, light emitted from the light source passes through the first optical element to collect at the mirror. The light from the mirror then enters the second optical element and outgoes from the second optical element as scanning light that is parallel light. The distribution of illuminance of the scanning light can change as needed. This can generate scanning light that is parallel light having the adjustable distribution of illuminance.

Preferably the light irradiation device of the present invention includes a mirror control unit configured to control a rotation period or a range of rotation angle of forward and reverse rotation of the mirror around the axis.

With this configuration, the rotation period or the range of the rotation angle of the forward and reverse rotation of the mirror about the axis are variable. The illuminance with the scanning light increases with a decrease in scanning speed. In this way, the rotation period or the range of rotation angle of forward and reverse rotation of the mirror around the axis can be controlled so as to control the illuminance with the scanning light.

Preferably the light irradiation device of the present invention further includes a light-source control unit configured to change brightness of the light source.

With this configuration, brightness of the light source is variable. The illuminance with the scanning light increases with brightness of the scanning light. In this way, the brightness of the light source can be controlled so as to control the illuminance with the scanning light.

A vehicular lamp of the present invention includes:

a light irradiation device including: a light source; a first optical element having a light-collection point on an emission side at a first position, the first optical element being configured to collect incident light from the light source at the first position; a light deflector including a mirror disposed at the first position, the mirror forward- and reverse-rotating around an axis passing through the first position, the light deflector being configured to reflect incident light from the first optical element with the mirror to deflect the light and emit the deflected light as scanning light; and a second optical element having a focal point on an incidence side at the first position, the second optical element being configured to emit the scanning light from the mirror as scanning light that is parallel to an optical axis; and an optical element for projecting configured to project the scanning light from the second optical element to an irradiation region ahead.

The present invention can match the range of scanning of scanning light that is incident from the second optical element to the optical element for projecting with the size of the irradiation region ahead of the vehicle, for example.

Preferably in the vehicular lamp of the present invention, the optical element for projecting has a light-collection point on an emission side at a second position, and the vehicular lamp includes a cover member that covers the optical element for projecting on an emission side and includes a penetrating light-transmission part at the second position.

This configuration allows scanning light from the optical element for projecting to pass through the penetrating light-transmission part toward the irradiation region. The cover member hides the optical element for projecting from the front of the vehicle, and so the aesthetic aspect of the vehicle at the front face can improve.

Preferably the vehicular lamp of the present invention further includes a light-shielding switching unit disposed between the second optical element and the optical element for projecting, the light-shielding switching unit having sections switched separately between shielding and non-shielding of scanning light that is incident from the second optical element.

This configuration includes the light-shielding switching unit that can switch between shielding and non-shielding of light for each of the sections. This can control the irradiation region while dividing it into irradiated sections and non-irradiated sections, and so can control the irradiation region very precisely as compared with the case of controlling by turning on and off of the light source. Such a precise control of the irradiation region into the irradiated sections and non-irradiated sections is preferable for a vehicular lamp to draw a pattern on the road surface, for example. When the light-shielding switching unit is a liquid crystal shutter, the characteristics, such as contrast ratio, of the liquid crystal shutter vary with the angle of incident light. Collimating of the scanning light to be incident on a liquid crystal shutter is therefore useful to obtain a better contrast ratio of the liquid crystal shutter.

Preferably the vehicular lamp of the present invention further includes a switching control unit configured to detect a presence region of the irradiation region where a target to be shielded is present and control the light-shielding switching unit so that light is shielded at a section of the light-shielding switching unit on an optical path of the scanning light from the second optical element toward the presence region.

This configuration can stop the irradiation of an object to be shielded with the scanning light.

BRIEF DESCRIPTION OF THE DRAWINGS

Some of the features and benefits of the present invention having been stated, others will become apparent as the description proceeds when taken in conjunction with the accompanying drawings, in which.

It will be understood the improvement described herein is not limited to the embodiments provided. On the contrary, the present disclosure is intended to cover all alternatives, modifications, and equivalents, as may be included within the spirit and scope of the improvement as defined by the appended claims.

DESCRIPTION OF THE PREFERRED EMBODIMENTS

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

[One Embodiment of Light Irradiation Device]

Figure 1:
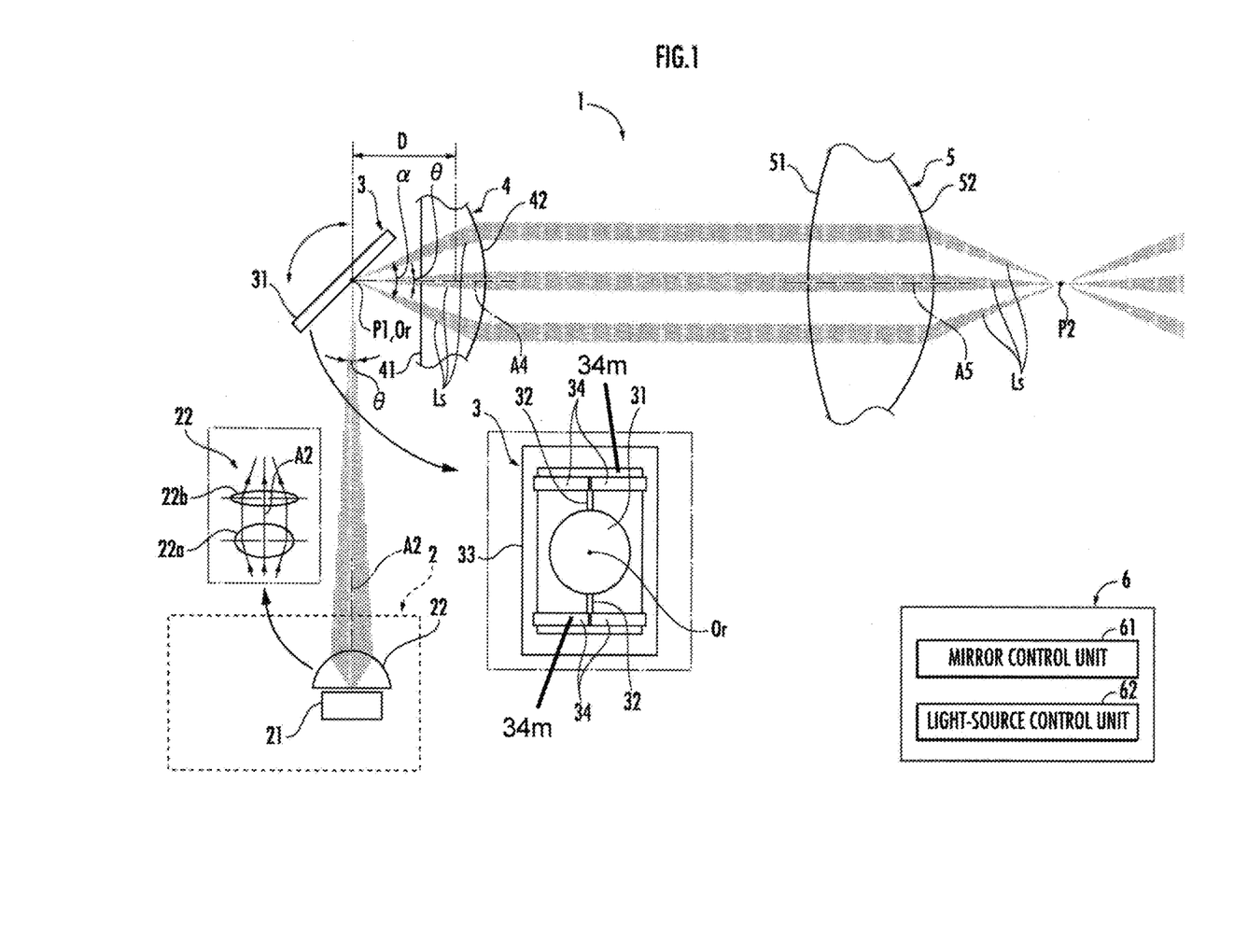
FIG. 1 shows the structure of a light irradiation device.

FIG. 1 shows the structure of a light irradiation device 1. The light irradiation device 1 includes a light-source module 2, a light deflector 3, a parallel light generation unit 4, a projecting light generation unit 5 and a controller 6 in this order from the upstream to the downstream of the optical path.

The light-source module 2 includes a LED 21 and a lens unit 22. Light emitted from the LED 21 travels along the optical path while diffusing in the direction normal to the travelling direction (increasing the diameter in the normal direction) to be incident on the lens unit 22 as a first optical element.

For the purpose of the present invention, the term "light-collection point" is defined as follows. When parallel light is incident on an ideal optical element, such as a lens or a curved mirror, in the direction parallel to the optical axis, the light emitted from the optical element collects on a focal point as one point on the emission side. The actual optical element, however, has aberration or manufacturing errors. Therefore when light parallel to the optical axis does not collect on the focal point but is slightly shifted from the focal point and travels in the vicinity of the focal point. When a part of the light parallel to the optical axis that is incident on an optical element on the incidence is used for the post-processing on the emission side, the region including the entire trace formed by the part of the parallel light on the emission side and being a circular or a spherical region having the minimum radius about the focal point on the emission side is defined as the "light-collection point" of the optical element.

The lens unit 22 includes a light-source side lens 22a and a mirror-side lens 22b such that their optical axes A2 are aligned on the same line. The LED 21 is substantially a point light source such that the emission point of the light emitted from the LED 21 is located on the focal point of the light-source side lens 22a on the incidence side. The mirror-side lens 22b has the light-collection point on the emission side at position P1 as a first position.

The light deflector 3 is a one-dimensional light deflector of a MEMS (Micro Electro Mechanical Systems). Since the structure of the light deflector 3 is well known, it is described briefly below. For the detailed structure, see JP 2014-56020 A and JP 2016-219603 A by the present applicant, for example.

The light deflector 3 includes a mirror 31, torsion bars 32, a support frame 33 and piezoelectric actuators 34. The mirror 31 is round, and has a mirror face on the surface. The position P1 is located at the mirror center Or as the center of the mirror 31. The two torsion bars 32 protrude from both sides of the mirror 31 along the extended line of the diameter of the mirror 31, and their protruding ends connect to the inner periphery of the support frame 33.

The four piezoelectric actuators 34 in total are inserted between the torsion bars 32 and the support frame 33. The piezoelectric actuators rotate the connecting parts with the torsion bars 32 about the axis of the torsion bars 32 in the forward and reverse directions. This rotates the mirror 31 about the axis of the torsion bars 32 in the forward and reverse directions. The rotation period and the range of rotation angle of the forward and reverse rotation are controlled by the frequency and the magnitude of voltage applied to piezoelectric membranes 34m of the piezoelectric actuators 34.

The parallel light generation unit 4 as a second optical element includes a convex lens, for example, and has an incidence plane 41 toward the light deflector 3 and an emission plane 42 toward the projecting light generation unit 5. This convex lens has the focal point on the incidence side that is set at the position P1. This allows the position P1 to serve as the light-collection point of the mirror-side lens 22b on the emission side, the mirror center Or of the mirror 31, and the focal point of the parallel light generation unit 4 on the incidence side.

The projecting light generation unit 5 has the optical axis A5 that is aligned with the optical axis A4 of the parallel light generation unit 4, and includes a projector lens, for example. The projecting light generation unit 5 has an incidence plane 51 toward the parallel light generation unit 4 and an emission plane 52 on the opposite side of the parallel light generation unit 4 that is on the side of the irradiation region of the light irradiation device 1. Position P2 as a second position is set on the emission side of the projecting light generation unit 5, and the projecting light generation unit 5 has a light-collection point on the emission side at the position P2.

For illustrative purposes, the axis of the torsion bars 32 that is the rotary axis of the mirror 31 of the light deflector 3 is referred to as a "vertical axis". Reflected light that is deflected and emitted from the mirror 31 creates light Ls to be scanned in a certain direction due to the forward and reverse rotation of the mirror 31 about the vertical axis. Such created scanning light Ls associates the scanning direction in the irradiation region with the "horizontal direction" of the irradiation region and associates the direction normal to the "horizontal direction" with the "vertical direction". These vertical and horizontal directions in the irradiation region correspond to the vehicle-height direction and the vehicle-width direction, respectively, of the vehicle in the irradiation region ahead of the vehicle that mounts the headlight 11, 12 for vehicle described later.

After passing through the position P2, the scanning light Ls from the projecting light generation unit 5 will have the reversed left-right relationship in the horizontal direction. That is, scanning light emitted from the left of the projecting light generation unit 5 in the horizontal direction will travel on the right in the horizontal direction after passing through the position P2.

The controller 6 includes a mirror control unit 61 and a light-source control unit 62. The mirror control unit 61 controls voltage applied to a piezoelectric membrane of each of the piezoelectric actuators 34 of the light deflector 3. The range of the rotation angle and the rotation period of the forward and reverse rotation of the mirror 31 about the vertical axis are controlled by the magnitude and the frequency of voltage applied to the piezoelectric membranes of the piezoelectric actuators 34.

The light-source control unit 62 controls the brightness of the LED 21 in the light-source module 2. Note here that the brightness of the LED 21 includes turning-off of the LED 21 as well that has the brightness=0. When the LED 21 turns on, the brightness of the LED 21 is A. The light-source control unit 62 controls the brightness of the LED 21 during illuminating by increasing or decreasing the current applied to the LED 21. The current applied to the LED 21 can be controlled based on the duty ratio between on and off of the current applied to the LED 21, for example.

The overall action of the light irradiation device 1 is described below. Light emitted from the light emitting part of the LED 21 that can be considered substantially as a point light source diffuses at a predetermined angle of divergence to be incident on the light-source side lens 22a. The LED 21 is located at the focal point of the light-source side lens 22a on the incidence side. The light emitted from the light-source side lens 22a therefore is collimated to be light parallel to the optical axis A2 and is incident on the mirror-side lens 22b.

Such light incident on the mirror-side lens 22b as parallel light is emitted from the mirror-side lens 22b and then is collected at the position P1 as the light-collection point of the mirror-side lens 22b on the emission side.

The position P1 is at the mirror center Or of the light deflector 3, and the mirror 31 is forward- and reverse-rotated about the vertical axis passing through the mirror center Or due to the action of the piezoelectric actuators 34. Both of the narrowing angle of the incident light that is incident on the mirror center Or from the mirror-side lens 22b when viewing the mirror-side lens 22b from the mirror center Or and of the angle of divergence of the scanning light Ls that is emitted as the reflected light from the mirror center Or to the parallel light generation unit 4 are $\theta$. These narrowing angle and angle of divergence are defined as the intersecting angle where edges of the light (or light flux) on both sides intersect at the light-collection point.

The scanning light Ls from the mirror 31 reciprocates over the incidence plane 41 of the parallel light generation unit 4 in the horizontal direction and in the range of the scanning angle $\alpha$ corresponding to the rotation angle of the forward and reverse rotation of the mirror 31 about the vertical axis. The scanning angle $\alpha$ of the scanning light Ls from the mirror 31 of the light deflector 3 is defined as the intersecting angle where the scanning light travelling along the both edges of the scanning range that is the horizontal direction viewed from the mirror center Or intersects at the mirror center Or.

Figure 2A:
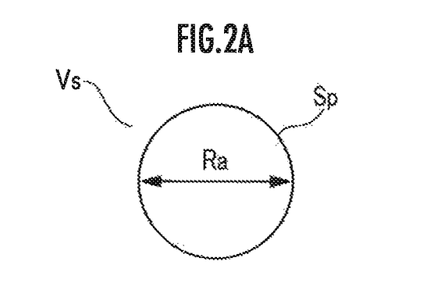
FIG. 2A shows the shape and the size of a spot that the scanning light emitted from the emission plane of the parallel light generation unit creates on a virtual screen.
Figure 2B:
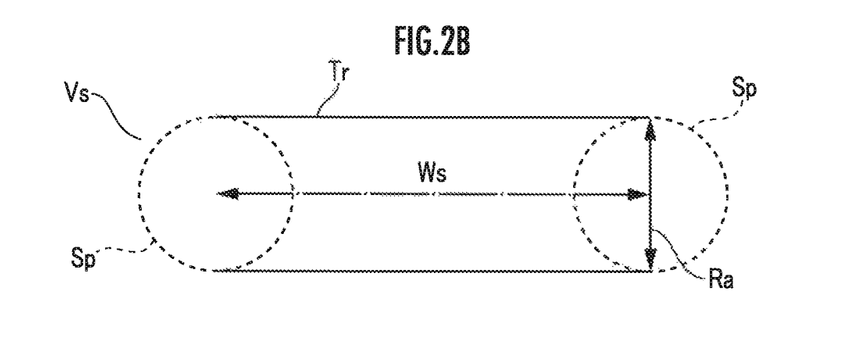
FIG. 2B shows the scanning trace that the scanning light forms on the virtual screen.

Assume herein that the scanning light Ls emitted from the incidence plane 41 of the parallel light generation unit 4 is incident on a virtual screen Vs that stands perpendicularly to the scanning light Ls. Both of FIGS. 2A and 2B show a spot Sp that the scanning light Ls emitted from the emission plane 42 of the parallel light generation unit 4 creates on the virtual screen Vs. FIG. 2A shows the shape and the dimension of the spot Sp that the scanning light Ls creates on the virtual screen Vs. FIG. 2B shows the scanning trace Tr that the scanning light Ls forms on the virtual screen Vs. The virtual screen Vs is virtually placed between the emission plane 42 of the parallel light generation unit 4 and the projecting light generation unit 5 so that the screen plane is perpendicular to the optical axis A4 of the parallel light generation unit 4. This screen is assumed to explain the spot Sp and the scanning trace Tr. The virtual screen Vs is not present in the actual light irradiation device 1.

The diameter Ra of the spot Sp on the virtual screen Vs can be calculated from the following Expression 1, and the scanning width Ws (scanning length in the horizontal direction) can be calculated from the following Expression 2.

$$\text{Diameter } Ra = 2 \cdot D \cdot \tan(\theta/2) \qquad \text{Expression 1.}$$

$$\text{Scanning width } Ws = 2 \cdot D \cdot \tan(\alpha/2) \qquad \text{Expression 2.}$$

In these expressions, D denotes the distance between the mirror center Or and the center of the parallel light generation unit 4 on the optical axis A4 of the parallel light generation unit 4. The height of the scanning trace Tr (dimension in the vertical direction) equals the diameter Ra.

The illuminance distribution (=light-distribution pattern) in the irradiation region of the light irradiation device 1 depends on the illuminance distribution of the scanning trace Tr on the virtual screen Vs. When the light irradiation device 1 operates as a vehicular lamp, especially as a headlight for vehicle, the light-distribution pattern in the irradiation region ahead of the vehicle depends on the illuminance distribution of the scanning trace Tr on the virtual screen Vs.

The mirror control unit 61 and the light-source control unit 62 of the controller 6 control the intensity of the spot Sp on the virtual screen Vs. Specifically the mirror control unit 61 increases or decreases the range of the rotation angle and the rotation period of the forward and reverse rotation of the mirror 31 of the light deflector 3 about the vertical axis to change the illuminance of the spot Sp on the virtual screen Vs. Note here that the intensity of the spot Sp itself means the brightness. When the spot Sp is scanned on the virtual screen Vs, the intensity means the illuminance in the scanning region.

When the brightness of the LED 21 does not change, a larger range of the rotation angle (corresponding to the scanning angle α and the scanning width Ws) of the mirror 31 means an increase in scanning speed of the spot Sp on the virtual screen Vs, and so the illuminance of the spot Sp decreases. When the brightness of the LED 21 does not change, a larger rotation period of the mirror 31 means a decrease in scanning speed of the spot Sp on the virtual screen Vs, and so the illuminance of the irradiated part with the spot Sp on the virtual screen Vs increases.

The light-source control unit 62 controls the brightness of the LED 21. A higher brightness of the LED 21 means an increase in brightness of the spot Sp, and so the illuminance of the irradiated part with the spot Sp on the virtual screen Vs increases.

Referring back to FIG. 1, the projecting light generation unit 5 is scanned at the incidence plane 51 with the scanning light Ls from the emission plane 42 of the parallel light generation unit 4 as described referring to the virtual screen Vs in FIG. 2, and emits the scanning light Ls from the emission plane 52. The trace of the scanning light Ls emitted from the emission plane 52 passes through the position P2 that is the light-collection point of the projecting light generation unit 5 on the emission side. In this way, the scanning light Ls has the diameter Ra and the scanning width Ws of the spot Sp on the virtual screen Vs as well as the distance of the light-collection point of the projecting light generation unit 5 (substantially corresponding to the distance of focal point) that are set so that the shape and the dimensions of the spot Sp and the scanning width Ws in the scanning direction after passing through the position P2 match with the shape and the size of the irradiation region.

The light irradiation device 1 can operate as the light irradiation device without the projecting light generation unit 5. In that case the spot Sp and the scanning trace Tr on the virtual screen Vs in FIG. 2 will be reproduced as they are in the irradiation region of the light irradiation device 1.

(First Embodiment of Vehicular Lamp)

Figure 3:
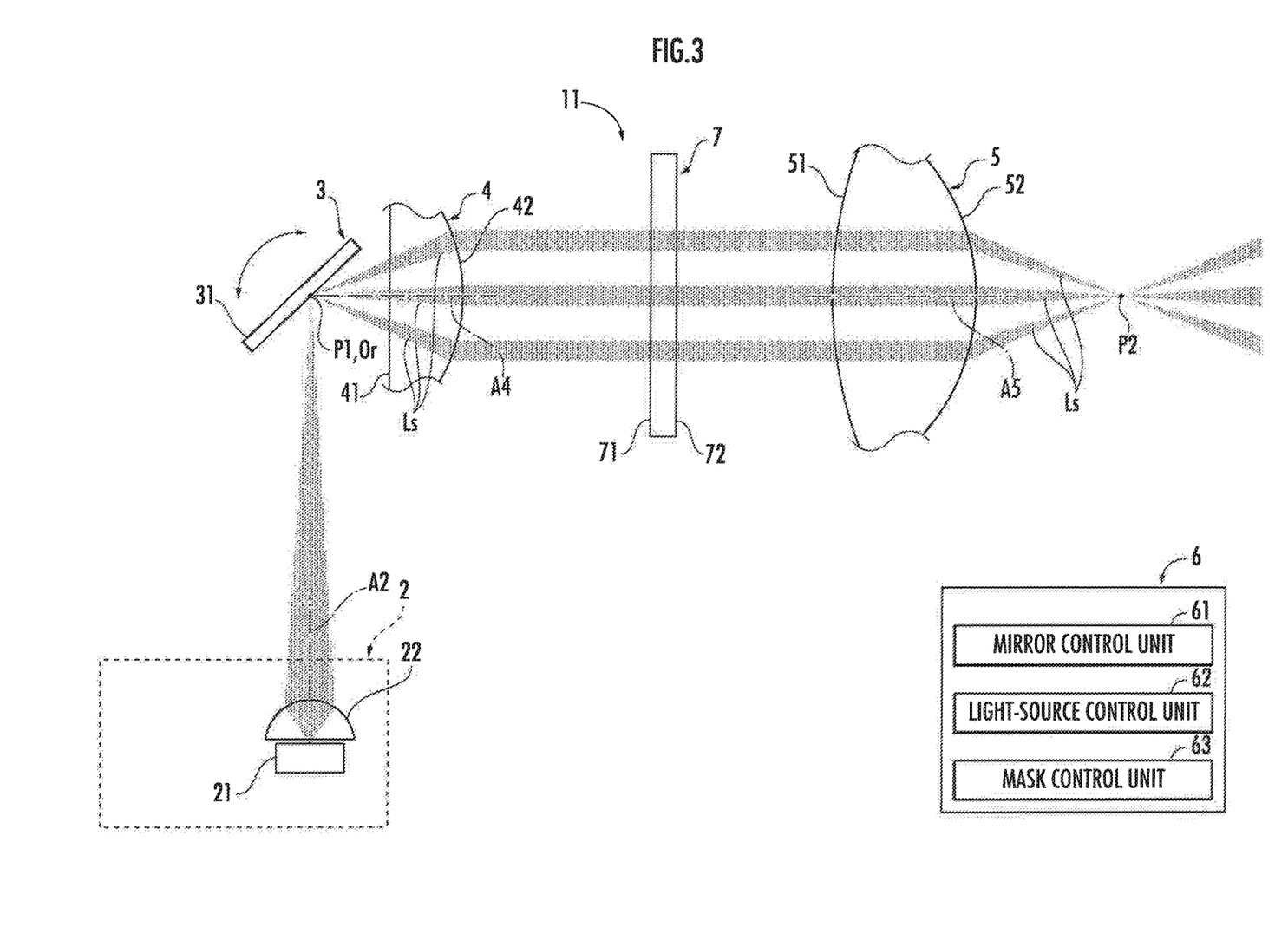
FIG. 3 shows the structure of a headlight for vehicle that is a first embodiment of the vehicular lamp.

FIG. 3 shows the structure of a headlight for vehicle 11 that is a first embodiment of the vehicular lamp. The headlight for vehicle 11 includes a liquid crystal shutter 7 as a light-shielding switching unit and a mask control unit 63 as a switching control unit that are added to the light irradiation device 1. The liquid crystal shutter 7 has an incidence plane 71 and an emission plane 72 that face the emission plane 42 of the parallel light generation unit 4 and the incidence plane 51 of the projecting light generation unit 5, respectively, and is disposed between the parallel light generation unit 4 and the projecting light generation unit 5. The center axis A7 of the liquid crystal shutter 7 coincides with the optical axis A4 of the parallel light generation unit 4.

The mask control unit 63 is added to the controller 6. The mask control unit 63 starts to operate in response to the presence or not of a vehicle ahead 76 (FIGS. 4A to 4C), for example, in the irradiation region ahead of the vehicle (hereinafter called "own vehicle") that mounts the headlight for vehicle 11, whereby the headlight for vehicle 11 functions as an ADB (Adaptive Driving Beam).

Figure 4A:
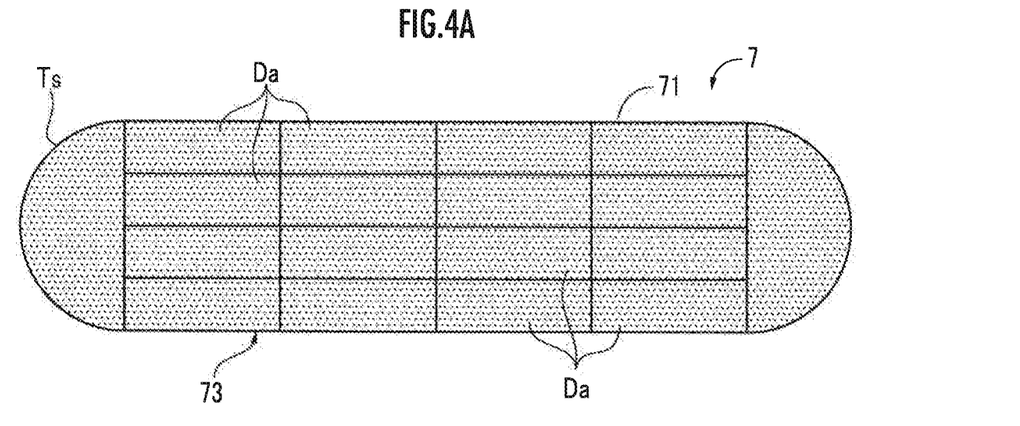
FIG. 4A shows a mask pattern when a vehicle ahead is not present ahead of the vehicle that mounts the headlight for vehicle.
Figure 4B:
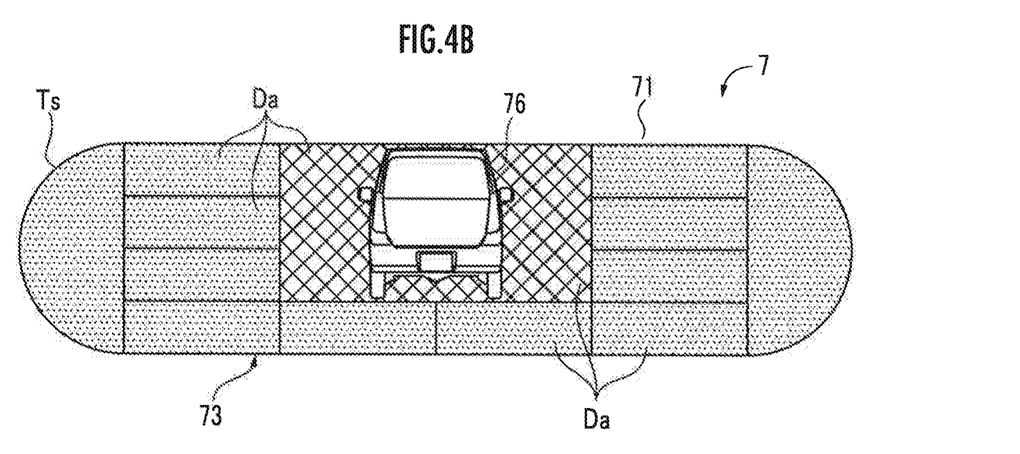
FIG. 4B shows a mask pattern when the presence of a vehicle ahead that is ahead of and in front of the vehicle is large.
Figure 4C:
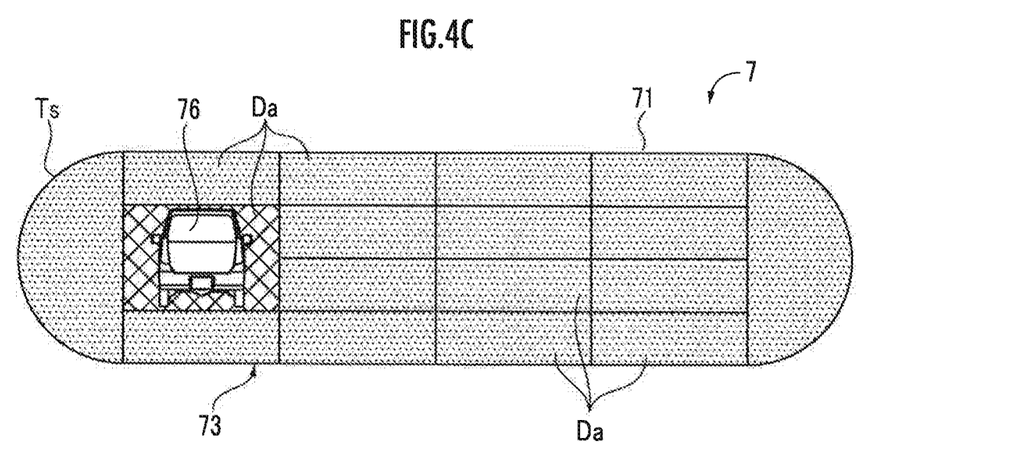
FIG. 4C shows a mask pattern when the presence of a vehicle ahead that is ahead of and on one side of the vehicle is small.

FIGS. 4A to 4C describe the headlight for vehicle 11 as the ADB. For illustrative purposes, the scanning trace Tr on the virtual screen Vs in FIG. 2 is overlapped on the incidence plane 71 of the liquid crystal shutter 7. FIG. 4A shows a mask pattern when a vehicle ahead 76 is not present ahead of the own vehicle. FIG. 4B shows a mask pattern when the presence of a vehicle ahead 76 that is ahead of and in front of the own vehicle is large. FIG. 4C shows a mask pattern when the presence of a vehicle ahead 76 that is ahead of and on one side of the own vehicle is small.

In FIGS. 4A to 4C, the spot Sp of the scanning light Ls from the parallel light generation unit 4 generates the scanning trace Ts on the incidence plane 71 of the liquid crystal shutter 7. This scanning trace Ts is the same as the scanning trace Tr on the virtual screen Vs. A mask control plane 73 is a rectangle that is horizontally long and is set inside of the incidence plane 71. For the scanning light Ls, only a part of the scanning light Ls that is applied to the mask control plane 73 serves as the scanning light that scans the irradiation target of the headlight for vehicle 11. A part of the scanning light Ls that is outside of the mask control plane 73 does not pass through the liquid crystal shutter 7, and so does not scan the irradiation target of the headlight for vehicle 11. Vertical and horizontal directions of the mask control plane 73 are the same as the vertical and horizontal directions of the scanning trace Tr in FIG. 2. The mask control plane 73 is divided vertically and horizontally into a plurality of sections Da.

The liquid crystal shutter 7 has the mask control plane 73 of the incidence plane 71 such that the sections Da can individually switch between shielding and non-shielding of the light irradiated on the mask control plane. Hereinafter a section Da in the shielding state is called a "masked section", and a section Da in the non-shielding state is called a "transmitting section". In FIGS. 4A to 4C, the sections Da with dot hatching indicate transmitting sections, and the sections Da with crosshatched lines indicate masked sections. The liquid crystal shutter 7 enables switching of each section Da between the masked section and the transmitting section in accordance with a control signal from the mask control unit 63 of the controller 6.

The mask control unit 63 of the controller 6 detects the presence or not of a vehicle ahead 76 ahead of the own vehicle based on an image taken by a camera not shown. The vehicle ahead 76 shown in FIGS. 4A to 4C actually means an image of the vehicle ahead 76 on the mask control plane 73.

When the mask control unit 63 determines that no vehicle ahead 76 is present ahead of the own vehicle, the mask control unit outputs a control signal to the liquid crystal shutter 7 so that all of the sections Da of the mask control plane 73 become the transmitting sections as shown in FIG. 4A.

When the mask control unit 63 determines that a vehicle ahead 76 is present ahead of the own vehicle, then the mask control unit detects a section Da in the mask control plane 73 occupied by the image of the vehicle ahead 76 based on the direction and the magnitude of the vehicle ahead 76 relative to the own vehicle, more specifically relative to the headlight for vehicle 11.

Next the mask control unit 63 outputs a control signal to the liquid crystal shutter 7 so that the section Da of the mask control plane 73 occupied by the image of the vehicle ahead 76 is a masked section and the remaining sections Da are transmitting sections. As shown in FIGS. 4B and 4C, the sections Da as the masked sections are the sections Da in the minimum number that include an image of the vehicle ahead 76 in the mask control plane 73.

As a result, if a vehicle ahead 76 is present ahead of the own vehicle when the headlight for vehicle 11 is used (nighttime), irradiation of the vehicle ahead 76 with the scanning light Ls is stopped. This can prevent the driver of the vehicle ahead 76 from being dazzled by the scanning light Ls from the own vehicle.

The contrast due to switching between shielding and non-shielding for each section Da of the liquid crystal shutter 7 greatly depends on the incidence angle of the light incident on the section Da. That is, when light is incident on a section Da in the direction parallel to the normal line of the incidence plane 71, the amount of light transmitting is the minimum and the maximum for the shielding and the non-shielding, respectively, so that a difference between them is the maximum. The liquid crystal shutter 7 of the headlight for vehicle 11 allows scanning light Ls to be incident on each section Da from the parallel light generation unit 4 in the direction parallel to the center axis A7. As a result, the contrast of the emitted light due to switching between shielding and non-shielding for each section Da of the liquid crystal shutter 7 can increase.

(Second Embodiment of Vehicular Lamp)

Figure 5:
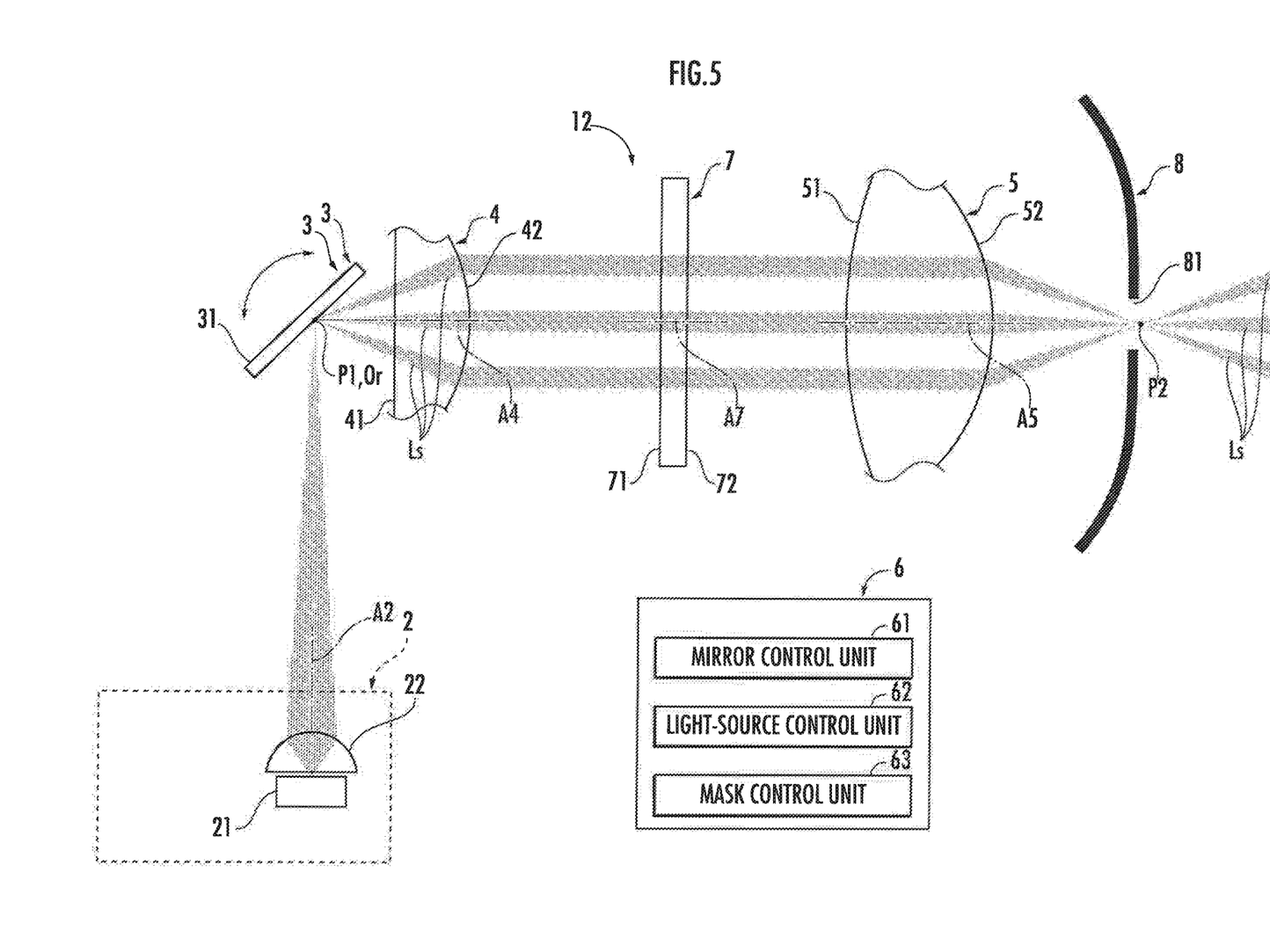
FIG. 5 shows the structure of a headlight for vehicle that is a second embodiment of the vehicular lamp.

FIG. 5 shows the structure of a headlight for vehicle 12 that is a second embodiment of the vehicular lamp. Similarly to the headlight for vehicle 11, the headlight for vehicle 12 also operates as an ADB. The headlight for vehicle 12 includes a cover member 8 in addition to the structure of the headlight for vehicle 11. The cover member 8 is disposed ahead of the projecting light generation unit 5 so as to cover the projecting light generation unit 5 from the front. The cover member 8 has a pin-hole 81 that is a penetrating light-transmission part at the position P2. The pin-hole 81 is a round in cross section and has a diameter slightly larger than the diameter of the light-collection point of the projecting light generation unit 5. The pin-hole penetrates through the cover member 8.

The position P2 is at the light-collection point of the projecting light generation unit 5 on the emission side. The cover member 8 therefore does not interfere with the entire of the scanning light Ls emitted from the emission plane 52 of the projecting light generation unit 5, and the scanning light can pass through the pin-hole 81 to reach the irradiation region ahead of the own vehicle and scan the irradiation region.

The cover member 8 can hide the projecting light generation unit 5 from the front of the own vehicle, and the cover member 8 can have any design. As a result, the aesthetic aspect of the own vehicle at the front face can improve.

Modified Examples

The above describes the vehicle ahead 76 as an object to be shielded in the irradiation region to stop the irradiation of the scanning light Ls from the headlight for vehicle 11, 12. The present invention is applicable to a pedestrian or an oncoming vehicle as the object to be shielded instead of the vehicle ahead 76 or together with the vehicle ahead 76.

The mask control unit 63 for the headlight for vehicle 11, 12 detects the region where the object to be shielded in the irradiation region is present to stop the irradiation of the scanning light Ls based on an image taken by the camera. The present invention may detect the region where the object to be shielded in the irradiation region is present by a laser radar or an ultrasonic radar, instead of based on an image taken by the camera.

In the light irradiation device 1, all of the light-source side lens 22a and the mirror-side lens 22b of the lens unit 22 as the first optical element and the parallel light generation unit 4 as the second optical element include lenses. In some embodiments of the present invention, the first optical element and the second optical element may include curved mirrors.

The embodiment of the light irradiation device includes one-dimensional light deflector as the light deflector 3. In some embodiments of the present invention, a biaxial two-dimensional light deflector may be used as the light deflector. In that case, the first position may be set at the point where two axes bisect at right angles at the mirror of the two-dimensional light deflector.

The headlight for vehicle 11, 12 as the embodiment of the vehicular lamp includes the liquid crystal shutter 7 as the light-shielding switching unit. In some embodiments of the present invention, an electrochromic shutter or a Digital Micromirror Device (DMD) may be used as the light-shielding switching unit.

The headlight for vehicle 11, 12 as the embodiment of the vehicular lamp controls the masked sections by shielding the light in sections Da of the mask control plane 73. In some embodiments of the present invention, the light deflector 3 may include a sensor to detect the rotation angle of the mirror 31 of the light deflector 3. Then, the LED 21 of the light-source module 2 can switch between on and off based on the angle detected by the sensor to generate masked sections. In that case, the liquid crystal shutter 7 can be omitted.

The light irradiation device 1 includes the projecting light generation unit 5 as an optical element for projecting. In some embodiments of the present invention, the optical element for projecting may be omitted in the light irradiation device. In that case, scanning light Ls emitted from the parallel light generation unit 4 travels straight toward the irradiation region of the light irradiation device.

The light irradiation device 1 and the headlight for vehicle 11, 12 include the LED 21 as the light source. In some embodiments of the present invention, other light sources, such as a laser light source, may be used instead of the LED 21.

The above describes the headlight for vehicle 11, 12 having the function of an ADB. In a modified example of the present invention, the headlight for vehicle 11, 12 may be a vehicular lamp configured to draw a pattern on the road surface ahead of, lateral to or behind the own vehicle. In that case, the mask control unit 63 determines shielding or non-shielding of light for each section Da of the liquid crystal shutter 7 based on the pattern to be drawn on the road surface, instead of the presence or not of the vehicle ahead 76.

The above describes the headlight for vehicle 11, 12 having the function of an ADB. In another modified example of the present invention, the headlight for vehicle 11, 12 may have a function of an AFS. In that case, the turning direction of the own vehicle may be detected from the steering angle of the steering wheel of the own vehicle, for example, and the light-source control unit 62 may control the brightness of the LED 21 during scanning of the scanning light Ls so that a part with the largest illuminance in the irradiation region ahead is shifted inside in the turning direction relative to the center of the irradiation region.

Instead of the headlight for vehicle 11, 12 having a single function as an ADB or an AFS, the headlight for vehicle may have both of the functions as an ADB and an AFS. In that case, the mask control unit 63 controls so that the section Da of the liquid crystal shutter 7 corresponding to the direction of the vehicle ahead 76 switches to the shielding state, and the light-source control unit 62 controls the brightness of the LED 21 during scanning of the scanning light Ls so that a part with the largest illuminance in the irradiation region ahead is shifted inside in the turning direction relative to the center of the irradiation region.

It will be appreciated by persons skilled in the art that the disclosed technique is not limited to what has been particularly shown and described hereinabove. Rather the scope of the disclosed technique is defined only by the claims, which follow.

What is claimed is:

1. A vehicular lamp comprising:
   a light source;
   a first optical element having a light-collection point on an emission side at a first position, the first optical element being configured to collect incident light from the light source at the first position;
   a light deflector including a mirror disposed at the first position, the mirror forward-and reverse-rotating around an axis passing through the first position, the light deflector being configured to reflect incident light from the first optical element with the mirror to deflect the light and emit the deflected light as scanning light;
   a second optical element configured as a convex lens, having a focal point on an incidence side at the first position and having an optical axis, the second optical element being configured to emit the scanning light from the mirror as scanning light that is parallel to the optical axis,
   an optical element for projecting configured as a convex lens, configured to project the scanning light from the second optical element to an irradiation region ahead, the optical element for projecting being arranged so that an optical axis thereof is aligned with the optical axis of the second optical element; and
   a light-shielding switching unit disposed between the second optical element and the optical element for projecting, the light-shielding switching unit having sections switched separately between a state of shielding and non-shielding of scanning light that is incident from the second optical element.

2. The vehicular lamp according to claim 1, further comprising
   a mirror control unit configured to control a rotation period or a range of rotation angle of forward and reverse rotation of the mirror around the axis
   wherein the mirror control unit changes the rotation period or the range of rotation angle.

3. The vehicular lamp according to claim 2, wherein the light deflector includes a piezoelectric actuator connected to the mirror through a torsion bar, and a rotation period and a range of rotation angle of forward- and reverse-rotation are controlled by a frequency and a magnitude of voltage applied to a piezoelectric membrane of the piezoelectric actuator.

4. The vehicular lamp according to claim 2, wherein the mirror has a rotation period which is controlled such that when the rotation period increases an illuminance of the irradiation region of the vehicular lamp also increases.

5. The vehicular lamp according to claim 1, further comprising
   a light-source control unit configured to change brightness of the light source
   wherein the light-source control unit changes the brightness of the light source.

6. The vehicular lamp according to claim 1, wherein
   the optical element for projecting has a light-collection point on an emission side at a second position, and
   the vehicular lamp includes a cover member that covers the optical element for projecting on the emission side, the cover member including a penetrating light-transmission part at the second position.

7. The vehicular lamp according to claim 1, further comprising:
   a switching control unit configured to detect a presence region of the irradiation region where a target to be shielded is present and control the light-shielding switching unit so that light is shielded at a section of the light-shielding switching unit on an optical path of the scanning light from the second optical element toward the presence region.

8. The vehicular lamp according to claim 1, wherein
   a center of the mirror of the light deflector is arranged at the first position,
   the light deflector including:
      a torsion bar protruding from both sides of the mirror along an extended line of a diameter of the mirror,
      a support frame, and inner periphery thereof being connected to a protruding end of the torsion bar, and
      a piezoelectric actuator positioned between the torsion bar and the support frame, the piezoelectric actuator being connected to the torsion bar and capable of rotating a connecting part of the piezoelectric actuator and the torsion bar in a forward and reverse-rotating around the axis.

9. The vehicular lamp according to claim 8, wherein a rotation period and a range of rotation angle of forward- and reverse-rotation are controlled by a frequency and a magnitude of voltage applied to a piezoelectric membrane of the piezoelectric actuator.

10. The vehicular lamp according to claim 1,
    wherein the scanning light from the mirror generates a scanning trace by reciprocating over an incidence plane of the second optical element in the horizontal direction in a range of a scanning angle corresponding to a rotation angle of the forward- and reverse-rotating of the mirror around the axis,
    wherein the scanning trace has at least one property that is the same as the irradiation region of the vehicular lamp.

11. The vehicular lamp according to claim 10, wherein the mirror has a rotation period which is controlled such that when the rotation period increases an illuminance of the irradiation region of the vehicular lamp also increases.

12. The vehicular lamp according to claim 10, wherein an incidence plane of the light-shielding switching unit includes a mask control plane that is set inside of the incident plane as a rectangle that is horizontally long, the mask control plane being composed of a plurality of the sections arranged vertically and horizontally,
wherein the vertical and horizontal directions of the scanning trace are respectively same as the vertical and horizontal directions of the mask control plane.

13. The vehicular lamp according to claim 1, wherein an incidence plane of the light-shielding switching unit includes a mask control plane that is set inside of the incident plane as a rectangle that is horizontally long, the mask control unit plane being composed of a plurality of the sections arranged vertically and horizontally.

* * * * *